(12) United States Patent
Kirchhoff et al.

(10) Patent No.: US 10,122,037 B2
(45) Date of Patent: Nov. 6, 2018

(54) METHOD FOR CONTROLLING AN OPERATING POINT CHANGE OF A FUEL CELL STACK AND A FUEL CELL SYSTEM

(71) Applicant: Volkswagen AG, Wolfsburg (DE)

(72) Inventors: Maren Ramona Kirchhoff, Braunschweig (DE); Sebastian Kirsch, Sassenburg (DE); Patrick Zihrul, Braunschweig (DE); Ingmar Hartung, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 244 days.

(21) Appl. No.: 15/090,340

(22) Filed: Apr. 4, 2016

(65) Prior Publication Data

US 2016/0315334 A1    Oct. 27, 2016

(30) Foreign Application Priority Data

Apr. 24, 2015  (DE) .......................... 10 2015 207 600

(51) Int. Cl.
*H01M 8/04* (2016.01)
*H01M 8/04828* (2016.01)
(Continued)

(52) U.S. Cl.
CPC ....... *H01M 8/0494* (2013.01); *H01M 8/0488* (2013.01); *H01M 8/0491* (2013.01);
(Continued)

(58) Field of Classification Search
CPC ............ H01M 8/00; H01M 8/02; H01M 8/04; H01M 8/22; H01M 8/0428; H01M 8/04992
See application file for complete search history.

(56) References Cited

U.S. PATENT DOCUMENTS

| 8,084,151 | B2 | 12/2011 | Umayahara et al. |
| 2005/0048335 | A1* | 3/2005 | Fields, III ......... H01M 8/04559 429/432 |

(Continued)

FOREIGN PATENT DOCUMENTS

| CN | 101351918 | 1/2009 |
| CN | 103682375 | 3/2014 |

(Continued)

*Primary Examiner* — Kenneth J Douyette
(74) *Attorney, Agent, or Firm* — Davidson, Davidson & Kappel, LLC

(57) ABSTRACT

A method for controlling an operating point change of a fuel cell stack (10) operated with an anode operating medium and with a cathode operating medium, in which the fuel cell stack (10) is controlled in such a way that, starting from an initial electric power (L1), the fuel cell stack generates a target power (L2) requested by an electrical consumer (51), which is greater than the initial power (L1) is provided. It is provided that the electric power generated by the fuel cell stack (10) is controlled in accordance with a predetermined current-voltage profile (S1, S2, S3), so that a voltage present at the fuel cell stack (10), starting from an initial voltage (U1) corresponding to the initial power (L1), passes through a local voltage minimum ($U_{min}$) and then increases to an end voltage corresponding to the target power (L2).

16 Claims, 2 Drawing Sheets

(51) Int. Cl.

| | | |
|---|---|---|
| *H01M 8/04992* | (2016.01) | |
| *H01M 8/04858* | (2016.01) | |
| *H01M 8/04746* | (2016.01) | |
| H01M 16/00 | (2006.01) | |
| H01M 8/04111 | (2016.01) | |
| H01M 8/04119 | (2016.01) | |
| H01M 8/1018 | (2016.01) | |

(52) U.S. Cl.
CPC .... *H01M 8/04753* (2013.01); *H01M 8/04111* (2013.01); *H01M 8/04141* (2013.01); *H01M 8/04149* (2013.01); *H01M 16/006* (2013.01); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 2007/0224468 A1 | 9/2007 | Akiyama et al. | |
| 2012/0225329 A1* | 9/2012 | Kazuno | H01M 8/04873 429/9 |
| 2014/0072887 A1 | 3/2014 | O'Leary et al. | |
| 2014/0272657 A1* | 9/2014 | Milacic | H01M 8/04955 429/444 |
| 2014/0335433 A1 | 11/2014 | Jomori et al. | |

FOREIGN PATENT DOCUMENTS

| | | |
|---|---|---|
| JP | 2008-130424 A | 6/2008 |
| JP | 2013-243047 A | 12/2013 |
| WO | WO 2008/111654 A1 | 9/2008 |

\* cited by examiner

METHOD FOR CONTROLLING AN OPERATING POINT CHANGE OF A FUEL CELL STACK AND A FUEL CELL SYSTEM

This claims the benefit of German Patent Application DE102015207600.8, filed Apr. 24, 2015 and hereby incorporated by reference herein.

The present invention relates to a method for controlling an operating point change of a fuel cell stack operated with an anode operating medium and a cathode operating medium, in which the fuel cell stack is controlled in such a way that, starting from an initial electric power, the stack generates a requested target power which is greater than the initial power. The present invention also relates to a fuel cell system configured to carry out the method and a vehicle having such a fuel cell system.

BACKGROUND

Fuel cells utilize the chemical conversion of a fuel with oxygen to water, in order to generate electric energy. For this purpose, fuel cells contain the so-called membrane electrode unit (MEA for membrane electrode assembly) as the core component, which is an arrangement of an ion-conducting (mostly proton-conducting) membrane and a catalytic electrode (anode and cathode) situated on each side of the membrane, respectively. The latter include mostly supported precious metals, in particular, platinum. In addition, gas diffusion layers (GDL) may be situated on each side of the membrane electrode unit on the side of the electrodes facing away from the membrane. The fuel cell is generally formed by a plurality of MEAs assembled in a stack, the electric powers of which are cumulative. Bipolar plates (also called flow field plates), which ensure that the individual cells are supplied with operating media, i.e., reactants, and are normally also used for cooling, are generally situated between the individual membrane electrode units. The bipolar plates also ensure an electrically conductive contact to the membrane electrode units.

During operation of the fuel cell, the fuel, in particular, hydrogen $H_2$ or a hydrogen-containing gas mixture, is fed to the anode via an open flow field of the bipolar plate on the anode side, where an electrochemical oxidation of $H_2$ to $H^+$ and simultaneous discharge of electrons takes place. A (water-bound or water-free) transport of the protons $H^+$ takes place from the anode chamber into the cathode chamber via the electrolytes or the membrane, which separates the reaction chambers from one another in a gas-tight manner and electrically isolates them. The electrons provided at the anode are conveyed to the cathode via an electric line. The cathode is supplied with oxygen or an oxygen-containing gas mixture (for example, air) via an open flow field of the bipolar plate on the cathode side, so that a reduction of $O_2$ to $2\,O^{2-}$ under absorption of the electrons takes place. At the same time, the oxygen anions react in the cathode chamber with the protons transported via the membrane while forming water.

During operation of fuel cell stacks in the low load range, as occurs, for example, in fuel cell vehicles, in particular, in urban traffic, load points are frequently driven, which correspond to a single cell voltage above 0.8 volts. Such high voltages result in an oxidation of the catalytic material, in particular of the cathode electrode, in which platinum reacts to form platinum oxide, which is significantly less reactive for the catalytic oxygen reduction than metallic platinum. In addition, the aforementioned voltages cause the platinum to dissolve into very small quantities, which enter into cationic solution. Thus, high single cell voltages of the fuel cell result on the whole in a loss of catalytic activity and available catalyst surface and, therefore, in a loss of fuel cell efficiency.

To counteract this phenomenon, the attempt is made in modern fuel cell vehicles to avoid the presence of stack voltages which correspond to a single cell voltage greater than 0.85 volts by way of a permanent, minimal load requirement of a few kW. It has been found, however, that during actual operation, the voltages obtained in the entire operating range nevertheless frequently lie above the specified voltage values and, therefore, in the harmful range.

From JP 2013-243047 A, it is known to avoid high output voltages of fuel cells which may cause damage to electrode catalysts. If a requested voltage corresponding to a requested power exceeds an upper cut-off voltage and also increases over time, the output voltage below the upper cut-off voltage is limited and a battery is charged with the surplus current.

According to JP 2008-130424 A, it is checked in the case of an increasing power requirement whether this could cause damage to the catalyst. If this is the case, the fuel cell is controlled in such a way that the output power is raised with a gradient slower than required and the missing power is supplemented by the battery.

WO 2008/111654 A1 (=DE 11 2008 597 B4) describes a method for activating the catalyst of fuel cells, in which the output voltage of the fuel cell is lowered to a level at which the oxides of the electrode catalyst are reduced. The method is carried out in a stationary operating situation, in which the required amount of power of the entire system is small and none of the fuel cell power is directly supplied to a traction motor, and the gas pedal of the vehicle is not actuated. The surplus power generated by the voltage drop is used preferably for charging the battery or is supplied to electrical auxiliary consumers of the vehicle.

SUMMARY OF THE INVENTION

It is an object of the present invention to provide a method for controlling an operating point change of a fuel cell stack, which at least partially eliminates the problems of the prior art. In particular, a degradation of the catalytic material is to be reduced or even prevented over a preferably large operating range of the fuel cell system.

The present invention provides a method for controlling an operating point change of a fuel cell stack and by a correspondingly configured fuel cell system and a corresponding vehicle.

Thus, a first aspect of the present invention relates to a method for controlling an operating point change of a fuel cell stack, which is operated with an anode operating medium and with a cathode operating medium. In this method, the fuel cell stack is controlled in such a way that, starting from an initial electric power, it generates a target power requested by an electrical consumer, for example, a traction motor of an electric vehicle, which is greater than the initial power. According to the present invention, the electric power generated by the fuel cell stack is controlled by a predetermined current-voltage profile, so that the cell voltage, starting from an initial voltage corresponding to the initial power passes through a local voltage minimum and then increases to an end voltage corresponding to the target power.

Thus, according to the present invention, the dynamic operation of a fuel cell stack, in particular, a positive load requirement of the latter, is used in order to pass through temporary low stack voltages and, therefore, low single cell voltages. Low stack voltages or single cell voltages result namely in a re-deposition and recrystallization of dissolved catalytic materials of the catalytic electrodes, in particular, the cathode. In addition, low voltages cause oxides of the formed catalytic material to be reduced while regaining the original metallic form. The utilization of an operating point change for effectuating such a regeneration of the catalytic material results in a regeneration of the catalytic material being frequently carried out in the entire operating range, for example, of a fuel cell vehicle. The utilization of a positive load requirement for the targeted induction of low cell voltages also has the advantage that the surplus amount of current generated by the starting of a low voltage may be collected directly by the main electrical consumers or auxiliary consumers or an electric energy store. When utilizing stationary operating points for regenerating the catalytic material as described in the prior art, the generated amount of current must always be collected by the battery or by the on-board electrical system. Generally, however, both lack corresponding power inputs or energy inputs, or the battery must have a correspondingly low state of charge in order to be able to collect the current. Thus, the utilization according to the present invention of dynamic operating states for the active induction of low cell voltages for regenerating the catalyst electrodes facilitates a fuel cell system dynamic as required on the one hand, and an effective catalyst regeneration on the other hand, and thus, a higher fuel cell efficiency with simultaneous load point changes causing little damage.

In a preferred embodiment of the method according to the present invention, the local voltage minimum corresponds to a single cell voltage of no more than 0.7 volts, in particular, of no more than 0.6 volts. It has been found that a significant recrystallization of the dissolved catalytic material and a reduction of the same occurred below these values. The local voltage minimum in the case of a single cell voltage is particularly preferably no more than 0.5 volts, in particular, no more than 0.4 volts.

An electric power of the fuel cell stack is preferably directly collected by an electrical consumer, in particular, by an electric traction motor of a vehicle during the operating point change, in particular, when the local voltage minimum is passed through. If an amount of energy which exceeds the instantaneous power requirement by the electrical consumer energy is generated in the process, in particular, when the local voltage minimum or power maximum is passed through, that energy is preferably stored in a corresponding energy store, such as a vehicle battery, a high-voltage battery or a capacitor.

The electric power is preferably controlled during the operating point change in accordance with the predetermined current-voltage profile by altering the mass flows of the anode operating medium and/or of the cathode operating medium of the fuel cell stack. Targeted interventions in the mass flows makes it possible to abandon the current-voltage characteristic curve (see FIG. 3) and to reach practically any operating point in the current-voltage characteristic map in a short period of time. This allows for the specific representation of the desired temporary voltage minimum. In addition, the control takes place preferably via the variation of the current drain from the fuel cell, i.e., current-controlled.

The present invention includes three possible strategies for controlling the electric power. According to one strategy, it is provided that the generated electric energy is controlled in accordance with a predetermined current-voltage profile, which briefly passes through a current intensity and/or power, which is higher than the target power or higher than the target power of this corresponding voltage. In this embodiment, therefore, the operating point to be reached is briefly deliberately overridden. The surplus power generated as a result, i.e. the power in excess of the power requested by the electrical consumer, in particular, the traction motor, is stored in an electric energy store, which is preferably a high-voltage battery or a capacitor, for example, a so-called SuperCap. Alternatively or in addition, the surplus current may be collected by other electrical consumers, for example, by an electrical consumer connected to an on-board electrical system.

In an alternative, second strategy of the present invention, it is provided that the generated electric power is controlled in accordance with a current-voltage profile in such a way that the voltage initially steadily drops to a current intensity corresponding to the target power, and the voltage subsequently rapidly or suddenly increases at an essentially constant current intensity until it reaches a voltage corresponding to the target power. The voltage is preferably ramped down by reducing the mass flows of the reactants of the fuel cell, in particular, of the cathode operating medium. This results in a depletion of the oxidant supplied at the cathode, which is mostly oxygen. Once the target current intensity is reached, the voltage may be suddenly raised to the target operating point by a sudden increase in the mass flow of the cathode operating medium.

According to a third alternative strategy, the generated electric power is controlled in accordance with a current-voltage profile in such a way that initially the voltage is suddenly ramped down to the local voltage minimum and subsequently suddenly ramped up again, and the current intensity then increases until it reaches a current intensity corresponding to the target power. The voltage is preferably initially lowered to 0 volts, thus, the fuel cell stack is briefly switched off then quickly restarted. This is achieved preferably by a rapid shut-off of the cathode operating medium. The advantage of this strategy is the achievement of a particularly low single cell voltage and, therefore, a particularly good regeneration effect of the catalytic electrode material. This strategy may also result in an increased transfer of the anode operating medium, the fuel, to the cathode side. This boosts the reduction of cationic platinum by the fuel, for example, hydrogen.

Another aspect of the present invention relates to a fuel cell system, including a fuel cell stack and a control unit for the former, which is configured to carry out the method according to the present invention. For this purpose, the control unit includes a computer-readable program algorithm, which carries out the method. The control unit may also include characteristic curves and/or characteristic maps, from which corresponding output values, for example, control values for actuating various components of the fuel cell system are ascertained as a function of input values.

Another aspect of the present invention relates to a vehicle having such a fuel cell system. This is preferably a vehicle which includes an electric motor as a traction motor, with which the vehicle is driven, alone or in combination with an internal combustion engine.

The various specific embodiments of the present invention cited in this application are advantageously combinable, unless otherwise specified for an individual case.

BRIEF DESCRIPTION OF THE DRAWINGS

The present invention is explained in greater detail in exemplary embodiments below with reference to the associated drawings.

DETAILED DESCRIPTION

Figure 1:
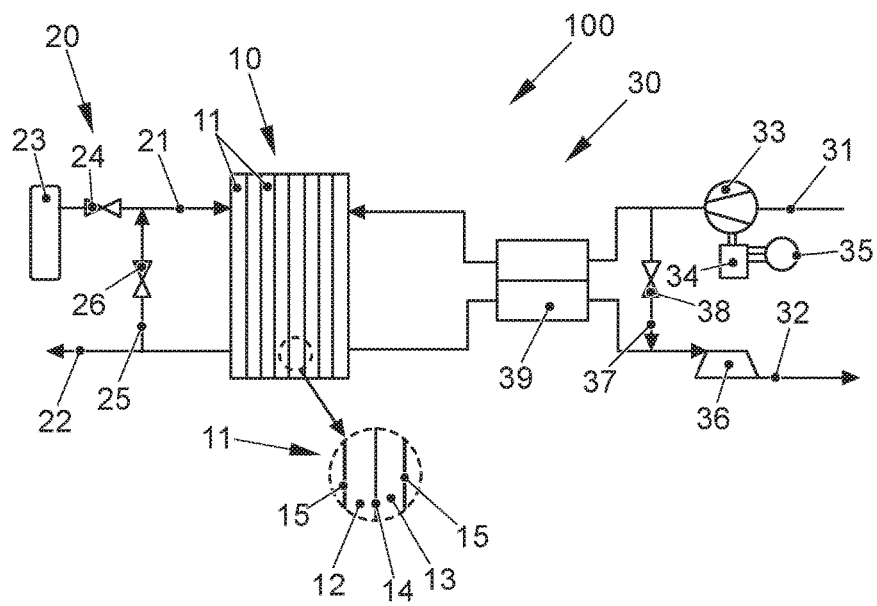
FIG. 1 shows a block diagram of a fuel cell system according to a preferred embodiment of the present invention.

FIG. 1 shows a fuel cell system, indicated as a whole by reference numeral 100, according to a preferred embodiment of the present invention. Fuel cell system 100 is part of a vehicle not further depicted, in particular an electric vehicle, which includes an electric traction motor supplied with electric energy by fuel cell system 100.

Fuel cell system 100 includes a fuel cell stack 10 as the core component, which is composed of a plurality of single cells 11 assembled in a stack. Each single cell 11 includes an anode chamber 12 and a cathode chamber 13 separated from one another by an ion-conductive polymer electrode membrane 14 (see detailed view). Anode chamber and cathode chamber 12, 13 each include a catalytic electrode, the anode and the cathode, which catalyzes the respective partial reaction of the fuel cell conversion. The anode electrode and cathode electrode include a catalytic material, for example, platinum, which is supported on an electrically conductive carrier material of a relatively large specific surface, for example, a carbon-based material. Situated between two such membrane electrode units is also a bipolar plate, marked in each case by reference numeral 15, which is used to feed the operating media into anode and cathode chambers 12, 13 and which also establishes the electrical connection between individual fuel cells 11.

To supply fuel cell stack 10 with the operating gases, fuel cell system 100 includes both an anode gas supply 20 and a cathode gas supply 30.

Anode gas supply 20 includes an anode supply path 21 which is used to feed an anode operating medium (the fuel), for example, hydrogen, into anode chambers 12 of fuel cell stack 10. For this purpose, anode supply path 21 connects a fuel storage 23 to an anode inlet of fuel cell stack 10. Anode gas supply 20 also includes an anode exhaust gas path 22, which discharges the anode exhaust gas from anode chambers 12 via an anode outlet of fuel cell stack 10. The anode operating pressure on anode sides 12 of fuel cell stack 10 is adjustable via an adjusting means 24 in anode supply path 21. Furthermore, anode gas supply 20 as depicted may include a fuel recirculation line 25 which connects anode exhaust gas path 22 to anode supply path 21. The recirculation of fuel is common in order to return fuel used mostly overstoichiometrically to the stack and to utilize it. A second adjusting means 26, with which the recirculation rate is adjustable, is situated in fuel recirculation line 25.

Cathode gas supply 30 includes a cathode supply path 31, which feeds an oxygen-containing cathode operating medium to cathode chambers 13 of fuel cell stack 10, in particular, air drawn in from the surroundings. Cathode gas supply 30 also includes a cathode exhaust gas path 32, which discharges the cathode exhaust gas (in particular, exhaust air) from cathode chambers 13 of fuel cell stack 10 and, if necessary, feeds it to an exhaust gas system not depicted.

A compressor 33 is situated in cathode supply path 31 for conveying and compressing the cathode operating medium. In the depicted exemplary embodiment, compressor 31 is designed as a mainly electromotively driven compressor, which is driven by an electric motor 34 equipped with corresponding power electronics 35. Compressor 33 may also be driven by a turbine 36 (optionally having a variable turbine geometry) situated in cathode exhaust gas path 32 while supported by a common shaft (not depicted). Turbine 36 represents an expander, which causes an expansion of the cathode exhaust gas and, therefore, a lowering of its pressure.

According to the depicted exemplary embodiment, cathode gas supply 30 may also include a wastegate line 37, which connects cathode supply line 31 to cathode exhaust gas line 32, i.e., represents a by-pass of fuel cell stack 10. Wastegate line 37 allows the operating pressure of the cathode operating medium in fuel cell stack 10 to be briefly reduced without ramping down compressor 33. An adjusting means 38 situated in wastegate line 37 allows the quantity of the cathode operating medium by-passing fuel cell stack 10 to be controlled. All adjusting means 24, 26, 38 of fuel cell system 100 may be designed as adjustable or non-adjustable valves or flaps. Additional corresponding adjusting means may be situated in lines 21, 22, 31 and 32 in order to be able to isolate fuel cell stack 10 from the surroundings.

Fuel cell system 100 also includes a humidifier module 39. Humidifier module 39 is situated on the one hand in cathode supply path 31 in such a way that the cathode operating gas may flow through it. On the other hand, it is situated in cathode exhaust gas path 32 in such a way that the cathode exhaust gas may flow through it. Humidifier 39 typically includes a plurality of water vapor-permeable membranes, which are designed to be flat or in the form of hollow fibers. In this design, one side of the membranes is overflowed by the comparatively dry cathode operating gas (air) and the other side by the comparatively moist cathode exhaust gas (exhaust gas). Driven by the higher partial pressure of water vapor in the cathode exhaust gas, water vapor passes via the membrane into the cathode operating gas, which is humidified in this manner.

Various additional details of anode gas supply and cathode gas supply 20, 30 are not shown in the simplified FIG. 1 for the sake of clarity. Thus, a water separator may be installed in anode exhaust gas path and/or cathode exhaust gas path 22, 32, in order to condense and drain off the product water formed by the fuel cell reaction. Finally, anode exhaust gas line 22 may open into cathode exhaust gas line 32, so that the anode exhaust gas and the cathode exhaust gas are discharged via a shared exhaust gas system.

Figure 2:
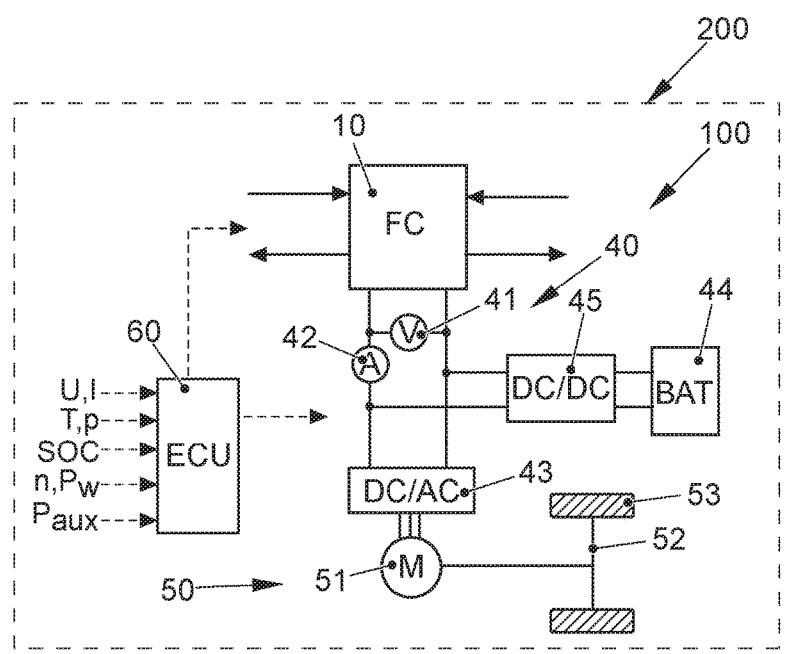
FIG. 2 shows a block diagram of a vehicle having a fuel cell system and electronic components according to a preferred embodiment of the present invention.

FIG. 2 shows a vehicle, identified as a whole by reference numeral 200, which includes fuel cell system 100 from FIG. 1, an electric power system 40, a vehicle drive system 50 and an electronic control unit 60.

Electronic power system 40 includes a voltage sensor 41 for detecting a voltage generated by fuel cell stack 10, and a current sensor 42 for detecting a current generated by fuel cell stack 10. Electronic power system 40 also includes an energy store 44, for example, a high-voltage battery or a capacitor. Energy store 44 is connected to the power supply via a converter 45, in particular, a high-voltage DC converter. In a same or similar manner, the fuel cell system itself, its electrical consumers, for example, electric motor 34 of compressor 33 (see FIG. 1) or other electrical consumers of the vehicle, for example, a compressor for an air conditioning unit and the like, may be connected to the power supply.

Drive system 50 includes an electric motor 51, which is used as the traction motor of vehicle 200. For this purpose, electric motor 51 drives a drive axle 52 with drive wheels 53 attached thereto. Traction motor 51 is connected to electronic power system 40 of fuel cell system 100 via an inverter 43, and represents the main electrical consumer of the system.

Electronic control unit 60 controls the operation of fuel cell system 100, in particular, its anode supply and cathode supply 20, 30, its electric power system 40 and traction motor 51. For this purpose, control unit 60 receives various input signals, for example, voltage U of fuel cell 10 detected with voltage sensor 41, current I of fuel cell 10 detected with current sensor 42, information about temperature T of fuel cell 10, pressures p in anode chamber and/or cathode chamber 12, 13, state of charge SOC of energy store 44, rotational speed n of traction motor 51 and additional input variables. Also included as an additional input variable is, in particular, a driving performance $P_W$ requested by a driver of vehicle 200. The latter variable is detected, in particular, from the force of the actuation of an accelerator pedal not depicted via a pedal value sensor. In addition, powers $P_{aux}$ requested by the additional electrical consumers of vehicle 200 may also be included in control unit 60.

Control unit 60 ascertains an overall requested power of fuel cell stack 10 as a function of the input variables, in particular from the sum of the requested driving performance $P_W$ and the powers $P_{aux}$ requested by the auxiliary consumers. Based on this, the control unit ascertains from computations or correspondingly saved characteristic maps the required mass flows or operating pressure of the anode operating medium and cathode operating medium, and activates electric motor 34 of compressor 33, as well as adjusting means 24, 26, 38, etc. of fuel cell system 100. In addition, control unit 60 activates inverter 43 in order to supply energy to traction motor 51, as well as converter 45 and other converters in order to charge or discharge energy store 44 and to supply energy to the consumers connected to the power supply.

Figure 3:
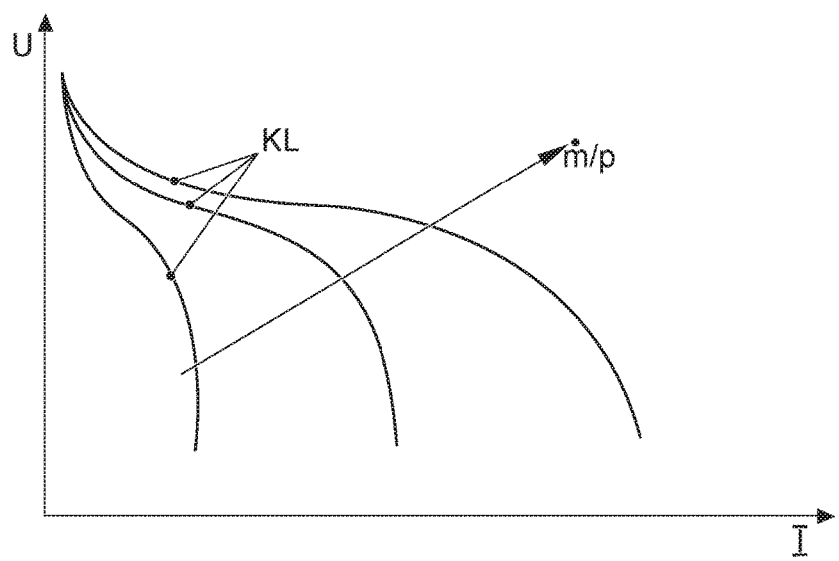
FIG. 3 shows current-voltage characteristic curves of a fuel cell stack with different reactant mass flows and reactant pressures.

FIG. 3 shows current voltage characteristic curves KL of a fuel cell stack for different mass flows m or operating pressures p of the anode operating medium or cathode operating medium. It is apparent that at a constant mass flow or operating pressure, cell voltage U drops as current intensity I increases. In addition, the power of the cell (i.e., the voltage at a constant current or the current intensity at a constant voltage) increases as well when the mass flow or the operating pressure of the anode- or cathode operating media is increased. The current drain in the fuel cell stack is current controlled over a wide operating range of the vehicle, the supplied operating media flows being modified in accordance with a predefined stoichiometry, i.e., a predefined substance amount ratio. By changing the stoichiometry of the supplied operating media, in particular, the air, it is possible—within certain limits—to reach any operating point within the current-voltage characteristics map.

When operating a vehicle, as depicted, for example, in FIG. 2, voltages of the fuel cell stack frequently occur, which may result in single cell voltages above 0.8 volts.

At such voltages, platinum oxide, which is significantly less reactive for the oxygen reduction at the cathode than metallic platinum, may be formed on the cathode catalyst (in this case, platinum) as a result of oxidation processes. Thus, the presence of platinum oxide limits the efficiency of the fuel cell, which is manifested in a lower single cell voltage at a requested current. Moreover, single cell voltages above 0.8 volts result in the dissolution of the platinum metal, in which very small amounts of $Pt^{2+}$ enter into solution. If dissolved platinum is removed from the system, this degradation phenomenon is irreversible and results in a reduction of efficiency. When platinum recrystallizes, another irreversible phenomenon occurs, since $Pt^{2+}$ is more heavily deposited on larger particles than on smaller particles (so-called Oswald Ripening), as a result of which effective catalytic surface area is lost.

To counteract the degradation of the electrode catalyst, an operating point change according to the present invention from an initial electric power to a target power requested by an electrical consumer, in particular, traction motor 51, which is greater than the initial power output, is used in order to induce a regeneration of the catalytic material. A situation is utilized, for example, in which a driver of the electric vehicle actuates the gas pedal in order to accelerate the vehicle. For this purpose, the electric power generated by fuel cell stack 10, starting from the initial power, is controlled in accordance with a predetermined current-voltage profile, which is disposed in such a way that a voltage present at fuel cell stack 10 initially passes through a local voltage minimum in order to then increase to an end voltage corresponding to the requested target power. For this purpose, different strategies may be applied according to the present invention having different current-voltage profiles, which are depicted in FIG. 4.

Figure 4:
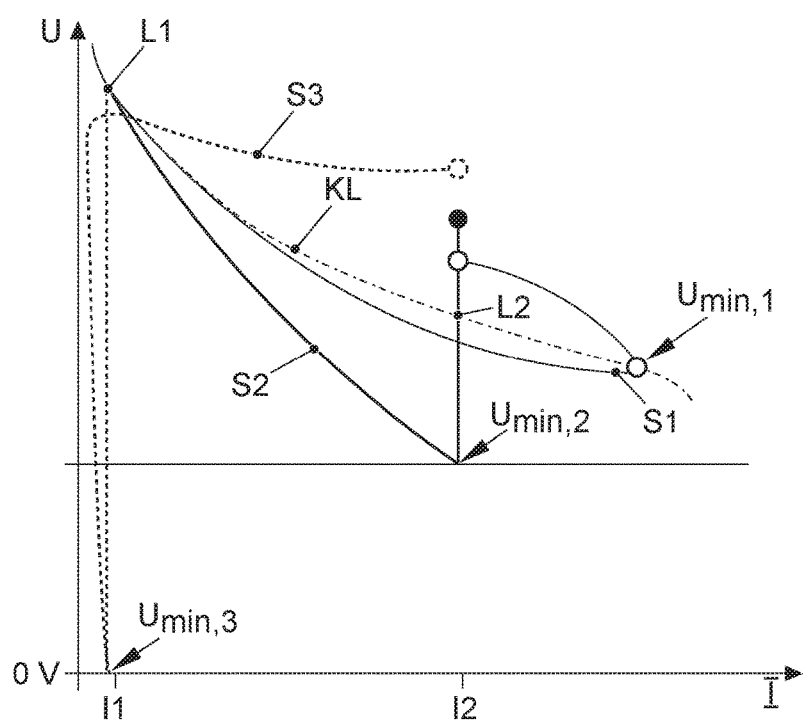
FIG. 4 shows current-voltage profiles of a fuel cell stack according to different control strategies.

FIG. 4 at first shows a current-voltage characteristic curve KL in which reactant is constantly fed to the fuel cell stack (cf. FIG. 3). Operating point L1 in this case refers to the operating point corresponding to the initial power, and L2 corresponds to the operating point of the requested target power. During conventional control, the current drain would be increased along the characteristic curve in order to arrive at target power L2.

The first strategy according to the present invention is explained with reference to the current-voltage profile S1 in FIG. 4. Starting from operating point L1, which corresponds to the initial power, the current drain from the fuel cell stack is increased beyond the target load point at a constant or at most slightly reduced stoichiometry (i.e., slight stoichiometric shortfall of air oxygen relative to the fuel). As a result of the merely slow reduction of the oxidized catalyst particles, the voltage drops according to profile S1, if necessary, slightly below characteristic curve KL. This process is continued up to a current intensity, which is greater than the current intensity requested by traction motor 51, whereby the voltage continues to drop. The current drain from fuel cell stack 10 is then ramped back to the requested current intensity I2. The point of profile S1 with the highest current intensity corresponds to a local minimum $U_{min,1}$. A certain regeneration of the platinum catalyst at the cathodes is achieved when a lower cell voltage compared to characteristic curve KL is passed through, as a result of which the efficiency of the fuel cell is increased. This results in the fact that at target current intensity I2 a higher voltage and, therefore, a higher momentary power is present which is higher than in the case of the characteristic-curved current drain. This reduces the ageing of the catalyst.

The second strategy according to the present invention is delineated with the current-voltage profile S2 in FIG. 4. Starting from original operating point L1, the current in this case is increased without accordingly rapidly adapting the air supply of the cathode of the fuel cell. This results in a reduction of the stoichiometry (i.e. an oxygen depletion) and, therefore, in a drop in voltage. If a targeted voltage threshold or a local voltage minimum $U_{min,2}$ is reached, for example, at a single cell voltage of 0.5 volts, current and stoichiometry are adapted to target power L2, resulting in a sudden increase in the cell voltage. Because of the low voltage values passed through, a regeneration of the catalytic material of the cathode electrode occurs, as a result of which the efficiency of the cell is improved, which is discernible by a higher voltage reached at the target load point.

The third strategy according to the present invention is depicted in FIG. 4 with reference to the current-voltage profile S3. According to this strategy, fuel cell stack 10 is briefly ramped down (for example, by switching off the air supply to the cathode and/or by lowering the voltage through the DC/DC converter) when a power request is discerned by traction motor 51, so that the cell voltage drops to approximately 0 volts. During that time, no current is drained from the stack. After the brief ramp down, stack 10 is immediately ramped up again, by ramping up the air supply again to the original mass flow or the original cathode operating pressure. The current supply is then ramped up to the requested level with the cell voltage dropping only slightly. The low voltage ($U_{min,3}=0$ volts) passed through during the brief switch-off of the fuel cell stack results in a very significant regeneration effect, in particular, also because the strong oxygen depletion at the cathode results in a diffusion of hydrogen across the membrane on the cathode side.

According to an advantageous additional step within the scope of the present invention, hydrogen may be guided directly to the cathode side of fuel cell stack 10 during the brief ramp-down of fuel cell stack 10 via a corresponding line extending from anode supply path 21 into cathode supply path 31. In this way, the reduction of oxidized platinum to metallic platinum may be further accelerated. The strategy depicted with profile S3 causes an interim power gap for supplying energy to traction motor 51, in which traction motor 51 is preferably supplied by energy store 44. For this reason, it may be provided to initially check the state of charge of energy store 44 and to only then apply strategy S3 if the SOC exceeds a predetermined threshold.

LIST OF REFERENCE NUMERALS 100 fuel cell system
200 vehicle
10 fuel cell stack
11 single cell
12 anode chamber
13 cathode chamber
14 polymer electrolyte membrane
15 bipolar plate
20 anode gas supply
21 anode supply path
22 anode exhaust gas path
23 fuel tank
24 adjusting means
25 fuel recirculation line
26 adjusting means
30 cathode gas supply
31 cathode supply path
32 cathode exhaust gas path
33 compressor
34 electric motor
35 power electronics
36 turbine
37 wastegate line
38 adjusting means
39 humidifier module
40 electrical power system
41 voltage sensor
42 current sensor
43 inverter
44 energy store/battery
45 DC converter
50 drive system
51 traction motor
52 drive axle
53 drive wheels
60 control unit

What is claimed is:

1. A method for controlling an operating point change of a fuel cell stack operated with an anode operating medium and with a cathode operating medium, the method comprising:
controlling the fuel cell stack in such a way that, starting from an electric initial power, the fuel cell stack generates a target power requested by an electrical consumer, the target power being greater than the initial power, the electric power generated by the fuel cell stack being controlled in accordance with a predetermined current-voltage profile, so that a voltage present at the fuel cell stack, starting from an initial voltage corresponding to the initial power, decreases to a local voltage minimum and then increases to an end voltage corresponding to the target power.

2. The method as recited in claim 1 wherein the local voltage minimum corresponds to a single cell voltage of no more than 0.7 volts.

3. The method as recited in claim 2 wherein the local voltage minimum corresponds to a single cell voltage of no more than 0.6 volts.

4. The method as recited in claim 1 wherein an electric power generated during the operating point change is directly consumed by an electrical consumer.

5. The method as recited in claim 4 wherein the electrical consumer is a traction motor.

6. The method as recited in claim 1 wherein the generated electric power is controlled by modifying a stoichiometry of the anode operating medium or of the cathode operating medium in accordance with the current-voltage profile.

7. The method as recited in claim 6 wherein the generated electric power is controlled by modifying the stoichiometry of the cathode operating medium in accordance with the current-voltage profile.

8. The method as recited in claim 1 wherein the generated electric power is controlled in accordance with the predetermined current-voltage profile passing through a current intensity or power higher than the target power, and further comprising storing a surplus power in an electric energy store.

9. The method as recited in claim 1 wherein the generated electric power is controlled in accordance with the predetermined current-voltage profile in such a way that initially the voltage decreases to a current intensity corresponding to the target power, after which the voltage increases at a constant current intensity until the voltage reaches a voltage corresponding to the target power.

10. The method as recited in claim 1 wherein the generated electric power is controlled in accordance with the predetermined current-voltage profile in such a way that initially the voltage is ramped down to the local voltage minimum, and then ramped up again, and the current intensity then increases until the current intensity reaches a current intensity corresponding to the target power.

11. The method as recited in claim 10 wherein the voltage is initially ramped down to 0 volts.

12. A fuel cell system comprising: a fuel cell stack, and a control unit configured to carry out executable steps to execute the method as recited in claim 1.

13. A vehicle comprising: a fuel cell system as recited in claim 12.

14. The method as recited in claim 9 wherein the voltage decrease to the current intensity corresponding to target power occurs by increasing the current without adapting the cathode operating medium.

15. The method as recited in claim 14 wherein a regeneration of catalytic material of a cathode occurs when the fuel cell stack is at the local voltage minimum.

16. The method as recited in claim 9 wherein the voltage increase occurring at the constant current intensity occurs by adapting a stoichiometry.

* * * * *